UNITED STATES PATENT OFFICE.

WILLIAM J. BURGESS, OF EAST CAMBRIDGE, ASSIGNOR TO HIMSELF AND EDWARD TURNER, OF QUINCY, MASSACHUSETTS.

IMPROVEMENT IN PROCESSES OF REMOVING GREASE FROM LEATHER.

Specification forming part of Letters Patent No. 176,423, dated April 25, 1876; application filed February 21, 1876.

*To all whom it may concern:*

Be it known that I, WILLIAM J. BURGESS, of East Cambridge, of the county of Middlesex and State of Massachusetts, have made a new and useful invention for Extracting Grease from Skins or Leather; and I do hereby declare the same to be fully described in the following specification:

Tanned skins generally have more or less grease in them after the process of tanning has been effected. To soften or render pliable and remove from a tanned skin the grease remaining in it is the object of my invention, in the carrying out or compounding of which I proceed as follows: First, I make a solution of one-half an ounce of cyanide of potassium, and one and one-half ounce of hot water. I also make another solution of one ounce of borate of soda, and one and one-half ounce of hot water. I also make another solution of one-fourth of an ounce of salts of tartar or bitartrate of potassa, and one and one-half ounce of cold water, after which I mix together the three solutions, and add thereto fifteen gallons of keroseline, a liquid, manufactured, the basis of which is naphtha, derived from the distillation of petroleum or other suitable hydrocarbon oil, and subject to careful fractional distillation. In preparing the distillate the naphtha should be treated with about six ounces of concentrated sulphuric acid to each gallon of the material, the whole being agitated for about a half an hour, and next allowed to rest for about one hour, in order for the acid and impurities to settle, after which they should be separated from the liquid, which next should be washed with water. Next, the liquid should be violently agitated for half an hour, with a sufficient amount of caustic-soda solution of 14° Baumé to each gallon of the liquid to neutralize any trace left of the acid. Next, the naphtha, thus treated, should be placed in a still, and to each gallon there should be added four ounces of a caustic-alkaline solution of 12° Baumé, after which, by the aid of steam, the naphtha should be fractionally distilled over. That portion lighter than 70° Baumé should be carefully separated from the rest, by allowing it to run into a suitable tank, it being the article termed, as above, "keroseline." Into the liquid composition thus made I immerse the greasy skin or skins for two and one-half hours, or thereabout, after which the skin or skins should be removed from the solution, and dried in the air, or by any suitable means.

I do not confine my invention to the precise proportions of the ingredients or chemical matters hereinbefore described, as such may be varied somewhat without materially changing their effect or effects.

I claim—

For the purpose set forth, the liquid composition, substantially as described, composed of keroseline and of cyanide of potassium, borate of soda, and salts of tartar, dissolved in water, as specified.

WM. J. BURGESS.

Witnesses:
R. H. EDDY,
J. R. SNOW.